US011966172B2

(12) United States Patent
Yamamoto et al.

(10) Patent No.: US 11,966,172 B2
(45) Date of Patent: Apr. 23, 2024

(54) CHARGING MEMBER, CHARGING DEVICE, PROCESS CARTRIDGE, AND IMAGE FORMING APPARATUS

(71) Applicant: FUJIFILM Business Innovation Corp., Tokyo (JP)

(72) Inventors: Takuya Yamamoto, Kanagawa (JP); Fuyuki Kano, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/152,583

(22) Filed: Jan. 10, 2023

(65) Prior Publication Data

US 2024/0085817 A1 Mar. 14, 2024

(30) Foreign Application Priority Data

Sep. 14, 2022 (JP) ................................ 2022-146377

(51) Int. Cl.
*G03G 15/02* (2006.01)
*G03G 21/18* (2006.01)

(52) U.S. Cl.
CPC ..... *G03G 15/0233* (2013.01); *G03G 21/1814* (2013.01); *G03G 2215/0861* (2013.01)

(58) Field of Classification Search
CPC ........... G03G 15/0233; G03G 21/1814; G03G 2215/0861
See application file for complete search history.

(56) References Cited

U.S. PATENT DOCUMENTS

2019/0369517 A1* 12/2019 Watanabe .......... G03G 5/14717
2021/0116857 A1* 4/2021 Hiyama .................. G03G 5/00
2021/0116858 A1* 4/2021 Watariguchi ......... G03G 5/0553

FOREIGN PATENT DOCUMENTS

| | | | |
|---|---|---|---|
| JP | 2007-071742 | A | 3/2007 |
| JP | 2008-233442 | A | 10/2008 |
| JP | 2018-146612 | A | 9/2018 |
| JP | 2019-076695 | A | 5/2019 |
| JP | 2020-160444 | A | 10/2020 |
| JP | 2020-173402 | A | 10/2020 |

* cited by examiner

*Primary Examiner* — Hoang X Ngo
(74) *Attorney, Agent, or Firm* — Sughrue Mion, PLLC

(57) ABSTRACT

A charging member includes: an electrically conductive base; an elastic layer disposed on the electrically conductive base; and a surface layer disposed on the elastic layer. A PFVTF value of a surface of the surface layer is 1.5 or less. The PFVTF value is obtained by Fourier transforming a roughness curve of the surface of the surface layer that is measured in a circumferential direction to thereby obtain amplitude intensities at different periods, multiplying the amplitude intensities at different periods by VTF coefficients at respective periods that are obtained from a visual characteristic VTFL* (f=period) for lightness L* represented by Formula (V) below to thereby obtain corrected amplitude intensities at different periods, and integrating the corrected amplitude intensities in a period range of from 100 μm to 1000 μm inclusive:

$$VTFL^*(f)=5.05\times(e^{(-0.843\times1\times f)}-e^{(-1.454\times1\times f)}).$$ Formula (V):

20 Claims, 4 Drawing Sheets

CHARGING MEMBER, CHARGING DEVICE, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2022-146377 filed Sep. 14, 2022.

BACKGROUND

(i) Technical Field

The present disclosure relates to a charging member, a charging device, a process cartridge, and an image forming apparatus.

(ii) Related Art

In an image forming apparatus using an electrophotographic system, first, the surface of an image holding member composed of a photoconductive photoreceptor made of an inorganic or organic material is charged using a charging device to form a latent image, and then the latent image is developed with a charged toner to form a visualized toner image. Then the toner image is transferred onto a recording medium such as a recording paper sheet directly or via an intermediate transfer body and fixed to the recording medium to thereby form an intended image.

The following proposals have been made on a charging member such as a charging roller included in the charging device.

For example, Japanese Unexamined Patent Application Publication No. 2008-233442 discloses "a charging roller for an electrophotographic device that includes a shaft, an elastic layer formed along the outer circumference of the shaft and having irregularities on its surface, and a surface layer that covers the surface of the elastic layer, wherein the irregularities on the elastic layer are formed by subjecting its surface to roughening processing, and wherein the surface of the elastic layer has a ten-point average surface roughness Rz greater than or equal to 1.5 μm and less than 8 μm, a material ratio tp (50%) of 60% or more, and a material ratio tp (40%) of 80% or less."

Japanese Unexamined Patent Application Publication No. 2018-146612 discloses "a charging device configured to impart electric charges to an image carrier disposed outside the charging device, the charging device including a cored bar member and a conductive resin layer disposed on a surface of the cored bar member, wherein the conductive resin layer has a thickness of 200 μm or less, and wherein the filtered maximum waviness of the cored bar member in its axial direction is 8 μm or less in a reference length range of 60 mm."

Japanese Unexamined Patent Application Publication No. 2020-173402 discloses "a charging roller that is rotatable and can charge a photoconductor, wherein, as for a surface roughness curve of the charging roller, the relations Rz≥7 [μm] and RΔq≤0.1 are satisfied, where Rz is the ten-point average surface roughness, and RΔq is the root mean square gradient."

Japanese Unexamined Patent Application Publication No. 2020-160444 discloses "a charging member including a conductive substrate, an elastic layer disposed on the conductive substrate, and a surface layer disposed on the elastic layer, wherein, on the surface of the surface layer, the ratio of the spacing of irregularities Sm to the ten-point average surface roughness Rz in the axial direction is 15≤Sm/Rz≤35 and a protruding peak height Spk is Spk≤5 μm.

SUMMARY

Aspects of non-limiting embodiments of the present disclosure relate to a charging member including an electrically conductive base, an elastic layer disposed on the electrically conductive base, and a surface layer disposed on the elastic layer. An image obtained using the charging member is less grainy than that when a PFVTF value of the surface of the surface layer is more than 1.5.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a charging member including:

an electrically conductive base;

an elastic layer disposed on the electrically conductive base; and a surface layer disposed on the elastic layer, wherein a PFVTF value of a surface of the surface layer is 1.5 or less, the PFVTF value being obtained by Fourier transforming a roughness curve of the surface of the surface layer that is measured in a circumferential direction to thereby obtain amplitude intensities at different periods, multiplying the amplitude intensities at different periods by VTF coefficients at respective periods obtained from a visual characteristic VTFL* (f=period) for lightness L* represented by Formula (V) below to thereby obtain corrected amplitude intensities at different periods, and integrating the corrected amplitude intensities in a period range of from 100 μm to 1000 μm inclusive:

$$VTFL^*(f)=5.05\times(e^{(-0.843\times1\times f)}-e^{(-1.454\times1\times f)}). \qquad \text{Formula (V):}$$

BRIEF DESCRIPTION OF THE DRAWINGS

An exemplary embodiment of the present disclosure will be described in detail based on the following figures, wherein.

DETAILED DESCRIPTION

Figure 1:
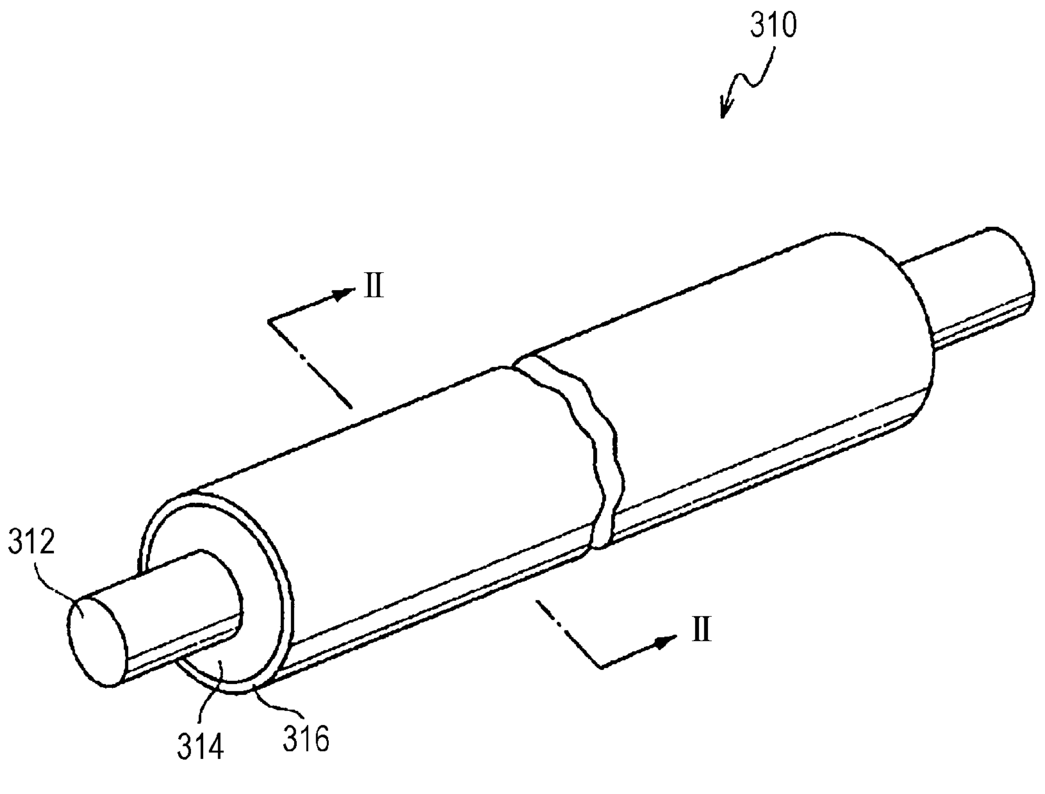
FIG. 1 is a schematic perspective view showing a charging member according to the exemplary embodiment.

An exemplary embodiment of the present disclosure will be described.

In the present specification, when reference is made to the amount of a component in a composition, if the composition contains a plurality of materials corresponding to the component, the amount means the total amount of the plurality of materials in the composition, unless otherwise specified.

In the present specification, an "electrophotographic photoconductor" may be referred to simply as a "photoconductor."

In the present specification, the "axial direction" of a charging member means a direction in which the rotation axis of the charging member extends. The "circumferential direction" of the charging member means its rotation direction.

In the present specification, the term "electrically conductive" means that the volume resistivity at 20° C. is $1\times10^{14}$ Ωcm or less.

The charging member according to the exemplary embodiment includes an electrically conductive base, an elastic layer disposed on the electrically conductive base, and a surface layer disposed on the elastic layer.

The PFVTF value of the surface of the surface layer is 1.5 or less. The PFVTF value is obtained by Fourier transforming a roughness curve of the surface of the surface layer that is measured in the circumferential direction to thereby obtain amplitude intensities at different periods, multiplying the amplitude intensities at different periods by VTF coefficients at respective periods obtained from a visual characteristic VTFL* (f=period) for lightness L* to thereby obtain corrected amplitude intensities at different periods, and integrating the corrected amplitude intensities in the period range of from 100 μm to 1000 μm inclusive.

With the charging member according to the exemplary embodiment having the structure described above, an image obtained is less grainy. The reason for this may be as follows.

In conventional charging members, the occurrence of streak-like image defects are reduced by improving the surface properties of the surface layer. Specifically, for example, the ten-point average surface roughness Rz, the spacing of irregularities Sm, the protruding peak height Spk, etc., are controlled to improve the resistance to contamination.

However, to control the ten-point average surface roughness Rz, the spacing of irregularities Sm, the protruding peak height Spk, etc., the surface irregularities with a period of 1 μm to several tens of μm are controlled. Therefore, although the resistance to contamination is improved, graininess having sensitivity to surface irregularities with a period of 100 μm of 1000 μm tends to be less improved.

Therefore, in the charging member according to the exemplary embodiment, the PFVTF value of the surface of the surface layer is reduced to control surface irregularities that have a large period of 100 μm to 1000 μm and to which the graininess has sensitivity.

In this manner, the charging member according to the exemplary embodiment allows an image obtained to be less grainy.

The charging member according to the exemplary embodiment will next be described with reference to the drawings.

Figure 2:
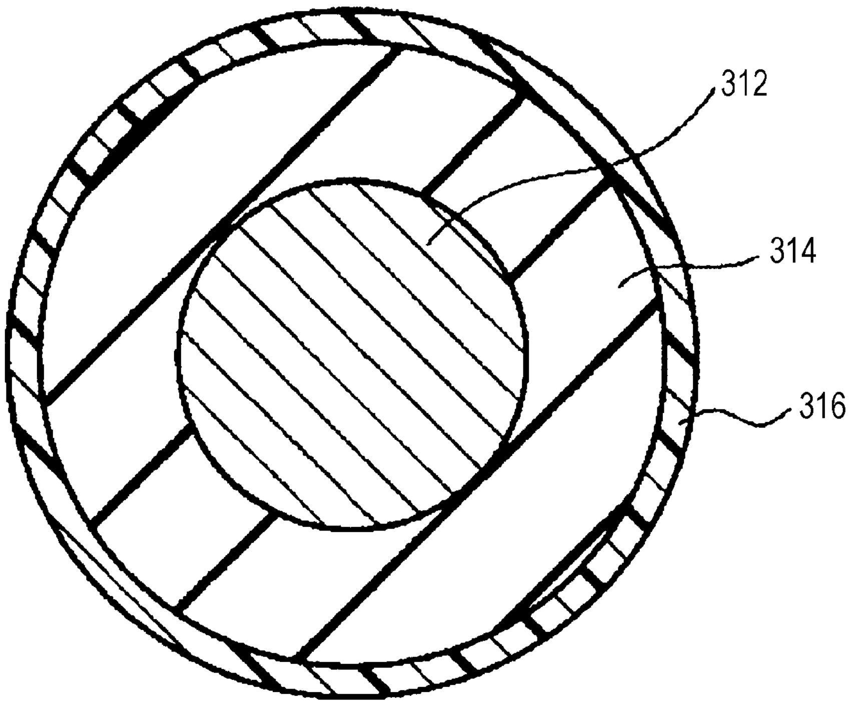
FIG. 2 is a schematic cross-sectional view of the charging member according to the exemplary embodiment.

FIG. 1 is a schematic perspective view showing the charging member according to the exemplary embodiment. FIG. 2 is a schematic cross-sectional view of the charging member according to the exemplary embodiment. The cross-sectional view in FIG. 2 is taken along II-II in FIG. 1.

As shown in FIGS. 1 and 2, the charging member 310 according to the exemplary embodiment is a roller member including, for example, a circular tubular or columnar electrically conductive base 312 (shaft), an elastic layer 314 disposed on the outer circumferential surface of the electrically conductive base 312, and a surface layer 316 disposed on the outer circumferential surface of the elastic layer 314.

The structure of the charging member 310 according to the exemplary embodiment is not limited to the structure described above. For example, the surface layer 316 may not be provided. Specifically, the charging member 310 according to the exemplary embodiment may include the electrically conductive base 312 and the elastic layer 314.

The charging member 310 may further include an intermediate layer (e.g., a bonding layer) disposed between the elastic layer 314 and the electrically conductive base 312 and a resistance-controlling layer or a migration preventing layer disposed between the elastic layer 314 and the surface layer 316.

The details of the charging member 310 according to the exemplary embodiment will be described. In the following description, reference numerals are omitted.

(PFVTF Value of Surface Layer)

In the charging member according to the exemplary embodiment, the PFVTF value of the surface of the surface layer is 1.5 or less. From the viewpoint of improving the graininess of images, the PFVTF value is preferably 1.0 or less and more preferably 0.7 or less.

The lower limit of the PFVTF value is ideally 0. However, because of production limitations, the PFVTF value is, for example, 0.5 or more.

The PFVTF value is controlled, for example, by changing the surface properties of the elastic layer. Specific examples of the method for adjusting the PFVTF value to the above range include the following methods.

1) A method in which the surface of the elastic layer on which the surface layer is to be disposed is polished using a grindstone and lapping paper. In particular, it is preferable to polish the surface using lapping paper with a grit size in the range of 4000 to 10000, and it is more preferable to use two types of lapping paper with grit sizes in the range of 4000 to 10000.

2) A method in which, when the elastic layer on which the surface layer is to be disposed is formed using an extrusion method, the temperature of the die used is increased to facilitate transfer of the surface shape of the die.

The PFVTF value of the surface layer is measured as follows.

First, the roughness curve of the surface layer of the charging member used for the measurement is obtained in the circumferential direction. Specifically, a contact surface roughness meter (SURFCOM 570A manufactured by TOKYO SEIMITSU Co., Ltd.) is used to determine the amplitude over the entire circumference at an axially central portion of the charging member according to JIS B 0601: 1994 (see FIG. 4A). The contact probe used has a diamond tip (5 μmR, 90° cone).

Figures 4A, 4B, 4C, 4D:
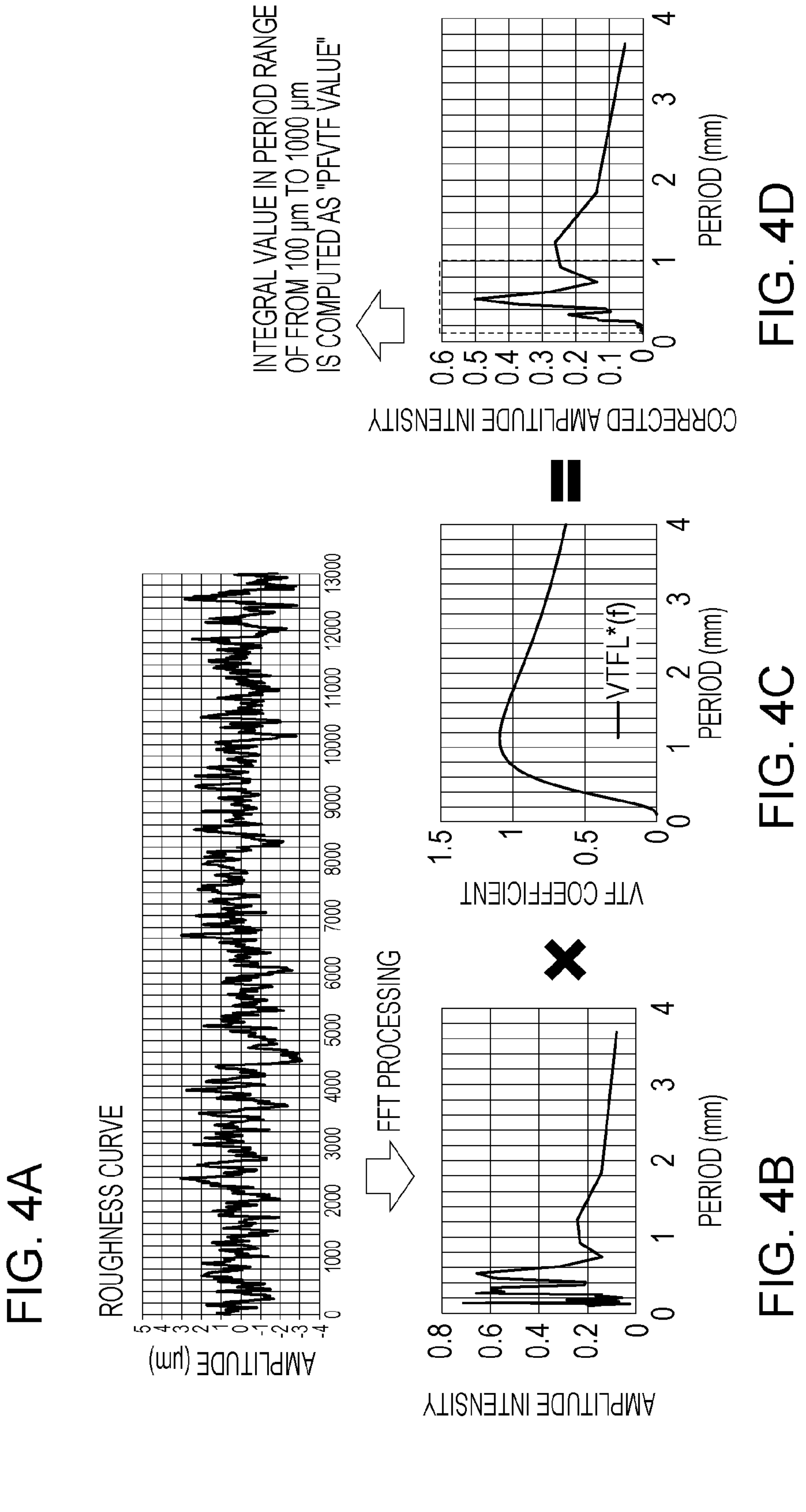
FIGS. 4A, 4B, 4C, and 4D show graphs for describing a method for determining a PFVTF value of a surface of a surface layer.

Next, the roughness curve of the charging member in the circumferential direction is subjected to fast Fourier transform (FFT) to obtain amplitude intensities at different periods (FIG. 4B).

Next, the visual characteristic VTFL* (f=period) for lightness L* represented by the following Formula (V) based on the Dooley's approximation called the visual transfer function is used to determine VTF coefficients at different periods (see FIG. 4C).

$$VTFL^*(f)=5.05\times(e^{(-0.843\times1\times f)}-e^{(-1.454\times1\times f)}) \quad \text{Formula (V):}$$

Next, the amplitude intensities at different periods are weighed using the VTF coefficients at respective periods (i.e., the amplitude intensities at different periods are multiplied by the VTF coefficients at respective periods) to thereby obtain corrected amplitude intensities at different periods (see FIG. 4D).

Then the corrected amplitude intensities at different periods are integrated in the period range of from 100 μm to 1000 μm inclusive, and the integral value computed is used as the PFVTF value.

(PFVTF Value of Elastic Layer)

In the charging member according to the exemplary embodiment, from the viewpoint of improving the graininess of images, the PFVTF value of the surface of the elastic layer is also preferably 1.5 or less, more preferably 1.0 or less, and still more preferably 0.7 or less.

The lower limit of the PFVTF value is ideally 0. However, because of production limitations, the PFVTF value is, for example, 0.5 or more.

The PFVTF value of the elastic layer is measured using the same method as that for the PFVTF value of the surface layer.

The details of the components of the charging member according to the exemplary embodiment will be described.

(Electrically Conductive Base)

The electrically conductive base will be described.

The electrically conductive base used is formed of, for example: a metal or an alloy such as aluminum, a copper alloy, or stainless steel; iron subjected to plating treatment using chromium, nickel, etc.; or an electrically conductive material such as an electrically conductive resin.

The electrically conductive base functions as an electrode and a support member of the charging roller. Examples of the material of the electrically conductive base include metals such as iron (e.g., free-machining steel), copper, brass, stainless steel, aluminum, and nickel. Examples of the electrically conductive base include a member (such as a resin or ceramic member) having an outer circumferential surface subjected to plating treatment and a member (such as a resin or ceramic member) containing a conducting agent dispersed therein. The electrically conductive base may be a hollow member (a tubular member) or may be a non-hollow member.

(Elastic Layer)

The elastic layer will be described.

The elastic layer is, for example, an electrically conductive layer containing an elastic material and a conducting agent. The elastic layer may contain optional additional additives.

Examples of the elastic material include isoprene rubber, chloroprene rubber, epichlorohydrin rubber, butyl rubber, polyurethane, silicone rubber, fluorocarbon rubber, styrene-butadiene rubber, butadiene rubber, nitrile rubber, ethylene propylene rubber, epichlorohydrin-ethylene oxide copolymer rubber, epichlorohydrin-ethylene oxide-allyl glycidyl ether copolymer rubber, ethylene-propylene-diene ternary copolymer rubber (EPDM), acrylonitrile-butadiene copolymer rubber (NBR), natural rubber, and rubber mixtures thereof. In particular, the elastic material is preferably polyurethane, silicone rubber, EPDM, epichlorohydrin-ethylene oxide copolymer rubber, epichlorohydrin-ethylene oxide-allyl glycidyl ether copolymer rubber, NBR, or a rubber mixture thereof. The elastic material may be a foamed product or may be a non-foamed product.

Examples of the conducting agent include an electron conducting agent and an ion conducting agent. Examples of the electron conducting agent include: powders of carbon black such as Ketjen black and acetylene black; powders of pyrocarbon and graphite; powders of various electrically conductive metals and alloys such as aluminum, copper, nickel, and stainless steel; powders of various electrically conductive metal oxides such as tin oxide, indium oxide, titanium oxide, tin oxide-antimony oxide solid solutions, and tin oxide-indium oxide solid solutions; and particles of insulating materials with their surfaces subjected to conducting treatment. Examples of the ion conducting agent include: perchlorates and chlorates of tetraethylammonium, lauryltrimethylammonium, etc.; and perchlorates and chlorates of alkali metals and alkaline earth metals such as lithium and magnesium.

One of these conducting agents may be used alone, or a combination of two or more may be used.

Specific examples of the carbon black include: products of Orion Engineered Carbons such as "Special Black 350," "Special Black 100," "Special Black 250," "Special Black 5," "Special Black 4," "Special Black 4A," "Special Black 550," "Special Black 6," "Color Black FW200," "Color Black FW2," and "Color Black FW2V"; and products of Cabot Corporation such as "MONARCH 1000," "MONARCH 1300," "MONARCH 1400," "MOGUL-L," and "REGAL 400R."

The average particle diameter of these conducting agents may be from 1 nm to 200 nm inclusive.

The average particle diameter is determined using a specimen cut from the elastic layer as follows. The specimen is observed under an electron microscope, and the diameters (maximum diameters) of 100 particles of the conducting agent are measured and averaged to compute the average particle diameter. The average particle diameter may be measured using, for example, a Zetasizer Nano ZS manufactured by SYSMEX Corporation.

No particular limitation is imposed on the content of the conducting agent. When the conducting agent is the electron conducting agent, the content is preferably in the range of from 1 part by mass to 30 parts by mass inclusive and more preferably in the range of from 15 parts by mass to 25 parts by mass inclusive based on 100 parts by mass of the elastic material. When the conducting agent is the ion conducting agent, the content is preferably in the range of from 0.1 parts by mass to 5.0 parts by mass inclusive and more preferably in the range of from 0.5 parts by mass to 3.0 parts by mass inclusive based on 100 parts by mass of the elastic material.

Examples of the additional additives mixed into the elastic layer include materials generally added to the elastic layer such as a softener, a plasticizer, a curing agent, a vulcanizing agent, a vulcanization accelerator, an antioxidant, a surfactant, a coupling agent, and a filler (such as silica or calcium carbonate).

The thickness of the elastic layer is preferably from 1 mm to 10 mm inclusive and more preferably from 2 mm to 5 mm inclusive.

The volume resistivity of the elastic layer may be from $10^3$ Ωcm to $10^{14}$ Ωcm inclusive.

The volume resistivity of the elastic layer is a value measured by the following method.

A sheet-like measurement specimen is cut from the elastic layer. Using a measurement jig (R12702A/B resistivity chamber manufactured by Advantest Corporation) and a high resistance meter (R8340A digital high resistance/minute ammeter manufactured by Advantest Corporation), a voltage is applied to the measurement specimen for 30 seconds according to JIS K 6911(1995) such that the electric field (the applied voltage/the thickness of the composition sheet) is adjusted to 1000 V/cm. Then the electric current flowing is used to compute the volume resistivity using the following formula.

Volume resistivity (Ωcm)=(19.63×applied voltage (V))/(current value (A)×thickness of measurement specimen (cm))

(Surface Layer)

The surface layer is, for example, a layer containing a resin. The surface layer may contain optional additional additives.

Resin

Examples of the resin include acrylic resins, fluorine-modified acrylic resins, silicone-modified acrylic resins, cellulose resins, polyamide resins, copolymerized nylons, polyurethane resins, polycarbonate resins, polyester resins, polyimide resins, epoxy resins, silicone resins, polyvinyl alcohol resins, polyvinyl butyral resins, polyvinyl acetal resins, ethylene tetrafluoroethylene resins, melamine resin, polyethylene resins, polyvinyl resins, polyarylate resins, polythiophene resins, polyethylene terephthalate (PET) resins, and fluorocarbon resins (such as polyvinylidene fluoride resins, tetrafluoroethylene resins, tetrafluoroethylene-perfluoroalkyl vinyl ether (PFA) copolymers, and tetrafluoroethylene-hexafluoropropylene (FEP) copolymers). The resin may be a curable resin cured or crosslinked using a curing agent or a catalyst.

The copolymerized nylon is a copolymer containing one or a plurality of 610 nylon, 11 nylon, and 12 nylon as polymerization units. The copolymerized nylon may contain an additional polymerization unit such as 6 nylon or 66 nylon.

In particular, from the viewpoint of reducing contamination of the surface layer, the resin is preferably a polyvinylidene fluoride resin, a tetrafluoroethylene resin, or a polyamide resin and more preferably a polyamide resin. The polyamide resin is less likely to undergo triboelectrification when in contact with a chargeable member (such as an image holding member), and therefore the adhesion of a toner and external additives can be easily prevented.

In particular, from the viewpoint of reducing contamination of the surface layer 316, the polyamide resin is preferably an alcohol-soluble polyamide, more preferably an alkoxymethylated polyamide (alkoxymethylated nylon), and still more preferably a methoxymethylated polyamide (methoxymethylated nylon).

The resin may have a crosslinked structure because the mechanical strength of the surface layer is improved and the occurrence of cracking in the surface layer is reduced.

The surface layer may contain irregularity-forming particles that impart irregularities on the surface of the surface layer.

No particular limitation is imposed on the material of the irregularity-forming particles, and the irregularity-forming particles may be inorganic particles or may be organic particles.

Specific examples of the irregularity-forming particles include: inorganic particles such as silica particles, alumina particles, and zircon ($ZrSiO_4$) particles; and resin particles such as polyamide particles, fluorocarbon resin particles, and silicone resin particles.

In particular, from the viewpoint of reducing contamination of the charging member, the irregularity-forming particles are more preferably resin particles and still more preferably polyamide particles.

The surface layer may contain only one type of irregularity-forming particles or may contain two or more types.

From the viewpoint of reducing the contamination of the charging member, it is preferable that the surface layer contains irregularity-forming particles having a volume average particle diameter of from 5 μm to 20 μm inclusive in an amount of from 5 parts by mass to 30 parts by mass inclusive based on 100 parts by mass of the binder resin. It is more preferable that the surface layer contains irregularity-forming particles having a volume average particle diameter of from 5 μm to 10 μm inclusive in an amount of from 8 parts by mass to 20 parts by mass inclusive based on 100 parts by mass of the binder resin.

To measure the volume average particle diameter of the irregularity-forming particles, a specimen cut from the surface layer is used and observed under an electron microscope. The diameters (maximum diameters) of 100 particles are measured and volume-averaged to compute the volume average particle diameter. The average particle diameter may be measured using, for example, a Zetasizer Nano ZS manufactured by SYSMEX Corporation.

When the surface layer contains the irregularity-forming particles, only the surface layer may contain the irregularity-forming particles, or both the surface layer and the elastic layer may contain the irregularity-forming particles.

Additional Additives

Examples of the additional additives include well-known additives generally added to the surface layer such as a conducting agent, a filler, a curing agent, a vulcanizing agent, a vulcanization accelerator, an antioxidant, a surfactant, and a coupling agent.

The thickness of the surface layer is, for example, preferably from 0.01 μm to 1000 μm inclusive and more preferably from 2 μm to 25 μm inclusive.

The thickness of the surface layer is a value measured by the following method. A specimen cut from the surface layer is used. The thickness of the cross section of the surface layer is measured at 10 points under an electron microscope, and the measured thicknesses are averaged.

The volume resistivity of the surface layer may be in the range of from $10^3$ Ωcm to $10^{14}$ Ωcm inclusive.

The volume resistivity of the surface layer is a value measured by the same method as the method for measuring the volume resistivity of the elastic layer.

The surface layer is formed, for example, by applying a coating solution prepared by dissolving or dispersing the above components in a solvent to the electrically conductive base (the outer circumferential surface of the elastic layer) using a dipping method, a blade coating method, a spraying method, a vacuum evaporation method, a plasma coating method, etc. and then drying the coating formed.

(Bonding Layer)

The charging member according to the exemplary embodiment may include a bonding layer interposed between the electrically conductive base and the elastic layer.

The bonding layer interposed between the elastic layer and the electrically conductive base may be a resin layer, and specific examples include resin layers formed of polyolefins, acrylic resins, epoxy resins, polyurethanes, nitrile rubbers, chlorine rubbers, vinyl chloride resins, vinyl acetate resins, polyesters, phenolic resins, and silicone resins. The bonding layer may contain a conducting agent (such as any of the above-described electron conducting agents and ion conducting agents).

From the viewpoint of adhesion, the thickness of the bonding layer is preferably from 1 μm to 100 μm inclusive, more preferably from 2 μm to 50 μm inclusive, and particularly preferably from 5 μm to 20 μm inclusive.

<Charging Device, Image Forming Apparatus, and Process Cartridge>

A charging device according to the exemplary embodiment includes the charging member according to the exemplary embodiment and charges an electrophotographic photoconductor by a contact charging method.

An image forming apparatus according to the exemplary embodiment includes: an image holding member; a charging device that charges a surface of the image holding member; an exposure device that irradiates the charged surface of the image holding member with light to form a latent image; a developing device that develops the latent image formed on the surface of the image holding member with a toner to form a toner image; and a transfer device that transfers the toner image formed on the surface of the image holding member onto a recording medium. The charging device includes the charging member according to the exemplary embodiment. In the charging device used (the charging device according to the exemplary embodiment), the charging member is disposed in contact with the surface of the image holding member.

A process cartridge according to the exemplary embodiment is detachably attached to, for example, the image forming apparatus having the above-described structure and includes, for example, an image holding member and a charging device that charges a surface of the image holding member. The charging device used is the charging device according to the exemplary embodiment.

The process cartridge according to the exemplary embodiment optionally includes, for example, at least one selected from the group consisting of an exposure device that irradiates the charged surface of the image holding member with light to form a latent image, a developing device that develops the latent image formed on the surface of the image holding member with a toner to form a toner image, a transfer device that transfers the toner image formed on the surface of the image holding member onto a recording medium, and a cleaning device that cleans the surface of the image holding member.

Next, the image forming apparatus and the process cartridge according to the exemplary embodiment will be described with reference to the drawings.

Figure 3:
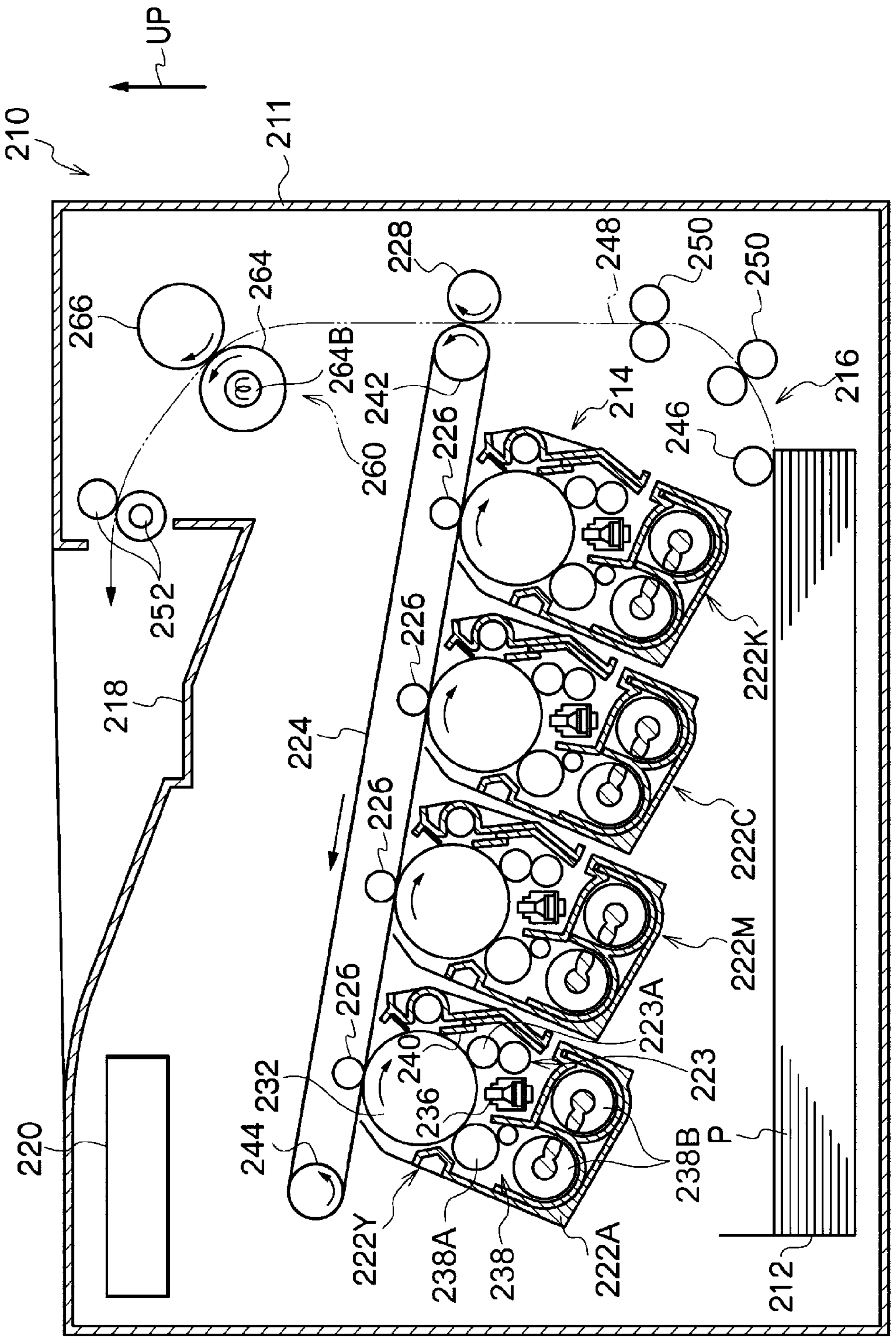
FIG. 3 is a schematic configuration diagram showing an image forming apparatus according to the exemplary embodiment.

FIG. 3 is a schematic configuration diagram showing the image forming apparatus according to the exemplary embodiment. An arrow UP in FIG. 3 indicates a vertically upward direction.

As shown in FIG. 3, the image forming apparatus 210 includes an image forming apparatus main body 211 that houses its components. The image forming apparatus main body 211 houses a container 212 that contains recording mediums P such as paper sheets, an image forming section 214 that forms images on a recording medium P, a transport unit 216 that transports a recording medium P from the container 212 to the image forming section 214, and a controller 220 that controls the operation of each of the components of the image forming apparatus 210. A discharge portion 218 to which the recording medium P having the images formed thereon in the image forming section 214 is to be discharged is disposed in an upper portion of the image forming apparatus main body 211.

The image forming section 214 includes: image forming units 222Y, 222M, 222C, and 222K (hereinafter referred to as 222Y to 222K) that form yellow (Y), magenta (M), cyan (C), and black (K) toner images, respectively; an intermediate transfer belt 224 onto which the toner images formed in the image forming units 222Y to 222K are to be transferred; first transfer rollers 226 that transfer the toner images formed in the image forming units 222Y to 222K onto the intermediate transfer belt 224; and a second transfer roller 228 that transfers the toner images transferred onto the intermediate transfer belt 224 by the first transfer rollers 226 from the intermediate transfer belt 224 onto a recording medium P. The structure of the image forming section 214 is not limited to the structure described above and may be any structure so long as an image can be formed on a recording medium P.

A unit composed of the intermediate transfer belt 224, the first transfer rollers 226, and the second transfer roller 228 corresponds to an example of the transfer device.

The image forming units 222Y to 222K are arranged in a vertically central portion of the image forming apparatus 210 so as to be inclined with respect to the horizontal. The image forming units 222Y to 222K have respective photoconductors 232 (examples of the image holding member) that rotate in one direction (e.g., the clockwise direction in FIG. 3). Since the image forming units 222Y to 222K have the same structure, the numerals of the components of the image forming units 222M, 222C, and 222K are omitted in FIG. 3.

Around each of the photoconductors 232, a charging device 223 including a charging roller 223A that charges the corresponding photoconductor 232, an exposure device 236 that irradiates the photoconductor 232 charged by the charging device 223 with light to form a latent image on the photoconductor 232, a developing device 238 that develops the latent image formed on the photoconductor 232 by the exposure device 236 to thereby form a toner image, and a removal member (such as a cleaning blade) 240 in contact with the photoconductor 232 to remove the toner remaining on the photoconductor 232 are sequentially disposed from the upstream side in the rotation direction of the photoconductor 232.

The photoconductor 232, the charging device 223, the exposure device 236, the developing device 238, and the removal member 240 are integrally held in a housing 222A and form a cartridge (process cartridge).

A self-scanning LED print head is applied to the exposure device 236. The exposure device 236 may be an optical exposure device including a light source that irradiates the photoconductor 232 with light via a polygon mirror.

The exposure device 236 is configured to form a latent image based on an image signal sent from the controller 220. The image signal sent from the controller 220 is, for example, an image signal acquired from an external device by the controller 220.

The developing device 238 includes a developer supply unit 238A that supplies the developer to the photoconductor 232 and a plurality of transport members 238B that transport the developer to be supplied to the developer supply unit 238A under stirring.

The intermediate transfer belt 224 is formed into an annular shape and disposed above the image forming units 222Y to 222K. The intermediate transfer belt 224 is wrapped around wrapping rollers 242 and 244 disposed on the inner circumferential side of the intermediate transfer belt 224. When one of the wrapping rollers 242 and 244 is driven and rotated, the intermediate transfer belt 224 rotationally moves (rotates) in one direction (e.g., in the counterclockwise direction in FIG. 3) while in contact with the photoconductors 232. The wrapping roller 242 is a counter roller facing the second transfer roller 228.

Each first transfer roller 226 faces the corresponding photoconductor 232 with the intermediate transfer belt 224 therebetween. The gap between the first transfer roller 226 and the photoconductor 232 serves as a first transfer position at which the toner image formed on the photoconductor 232 is transferred onto the intermediate transfer belt 224.

The second transfer roller 228 faces the wrapping roller 242 with the intermediate transfer belt 224 therebetween. The gap between the second transfer roller 228 and the wrapping roller 242 serves as a second transfer position at which the toner images transferred onto the intermediate transfer belt 224 are transferred onto a recording medium P.

The transport unit 216 includes: a delivery roller 246 that delivers a recording medium P contained in the container 212; a transport path 248 through which the recording medium P delivered by the delivery roller 246 is transported; and a plurality of transport rollers 250 that are disposed along the transport path 248 and transport the recording medium P delivered by the deliver roller 246 to the second transfer position.

A fixing device 260 that fixes the toner images formed on the recording medium P in the image forming section 214 to the recording medium P is disposed downstream of the second transfer position in the transport direction.

The fixing device 260 includes a heating roller 264 that heats the images on the recording medium P and a pressurizing roller 266 serving as an example of a pressurizing member. A heat source 264B is disposed inside the heating roller 264.

Discharge rollers 252 that discharge the recording medium P with the toner images fixed thereto to the discharge portion 218 are disposed downstream of the fixing device 260 in the transport direction.

Next, image forming operations for forming an image on a recording medium P in the image forming apparatus 210 will be described.

In the image forming apparatus 210, a recording medium P delivered by the delivery roller 246 from the container 212 is transported to the second transfer position by the plurality of transport rollers 250.

In each of the image forming units 222Y to 222K, the exposure device 236 irradiates the photoconductor 232 charged by the charging device 223 with light to form a latent image on the photoconductor 232. The latent image is developed by the developing device 238 to form a toner image on the photoconductor 232. The toner images of respective colors formed in the image forming units 222Y to 222K are superposed on the intermediate transfer belt 224 at the first transfer positions to thereby form a color image. The color image formed on the intermediate transfer belt 224 is transferred onto the recording medium P at the second transfer position.

The recording medium P with the toner images transferred thereonto is transported to the fixing device 260, and the transferred toner images are fixed by the fixing device 260. The recording medium P with the toner images fixed thereonto is discharged to the discharge portion 218 by the discharge rollers 252. The series of the image forming operations are performed as described above.

The structure of the image forming apparatus 210 according to the exemplary embodiment is not limited to the structure described above. For example, the image forming apparatus 210 may be any well-known image forming apparatus such as a direct transfer-type image forming apparatus in which the toner images formed on the photoconductors 232 of the image forming units 222Y to 222K are transferred directly onto a recording medium P.

EXAMPLES

The present disclosure will be described in more detail by way of Examples, but the present disclosure is not limited to the following Examples. In the following description, "parts" means "parts by mass" unless otherwise specified.

Example 1

-Preparation of Electrically Conductive Base-

A base made of SUM23L is electroless-plated with nickel to a thickness of 5 μm and then treated with hexavalent chromic acid to obtain an electrically conductive base having a diameter of 8 mm.

-Formation of Bonding Layer-

Next, a mixture described below is stirred in a ball mill for one hour and applied to the surface of the electrically conductive base using a brush to form a bonding layer having a thickness of 10 μm.

Chlorinated polypropylene resin (maleic anhydride chlorinated polypropylene resin, Superchlon 930 manufactured by NIPPON PAPER CHEMICALS Co., Ltd.): 100 parts Epoxy resin (EP4000 manufactured by ADEKA): 10 parts Conducting agent (carbon black, Ketjen black EC manufactured by Ketjen Black International): 2.5 parrs Toluene or xylene is used to control the viscosity.

-Formation of Elastic Layer-

Epichlorohydrin rubber (Hydrin T3106 manufactured by ZEON CORPORATION): 100 parts by mass Carbon black (Asahi #60 manufactured by Asahi Carbon Co., Ltd.): 6 parts by mass Calcium carbonate (WHITON SB manufactured by Shiraishi Calcium Kaisha, Ltd.): 20 parts by mass Ion conducting agent (BTEAC manufactured by Lion Corporation): 5 parts by mass Vulcanization accelerator: stearic acid (manufactured by NOF CORPORATION: 1 part by mass Vulcanizing agent: 4,4'-Dithiodimorpholine (VULNOC R manufactured by OUCHI SHINKO CHEMICAL INDUSTRIAL CO., LTD.): 1 part by mass Vulcanization accelerator: zinc oxide: 1.5 parts by mass The mixture having the above composition is kneaded using a tangential-type pressurizing kneader and caused to pass through a strainer to prepare a rubber composition. The rubber composition obtained is kneaded using an open roll mill and then extruded onto the surface of the prepared electrically conductive base using an extruder with the bonding layer interposed therebetween to thereby form a roll with a diameter of 12 mm. The roll is heated to 175° C. for 70 minutes to thereby obtain a roll-shaped elastic layer.

Next, the obtained elastic layer is subjected to rough polishing/finish polishing using grindstones and then polished with two lapping papers with different grit sizes (product name: "lapping film sheets" manufactured by 3M, grit size=4000 and grit size=10000). Specifically the entire surface of the elastic layer is polished with a lapping paper with a grit size of 4000 and then with a lapping paper with a grit size of 10000 while the roll is rotated.

-Formation of Surface Layer-

Binder resin: N-methoxymethylated nylon 1 (product name: FR101 manufactured by Namariichi Co., Ltd.): 100 parts by mass Conducting agent: carbon black (volume average particle diameter: 43 nm, product name: MONAHRCH 1000 manufactured by Cabot Corporation): 15 parts by mass Irregularity-forming particles: polyamide particles (volume average particle diameter: 10 μm, product name: Orgasol 2001EXDNat1 manufactured by ARKEMA): 12 parts by mass A mixture having the above composition is diluted with methanol and dispersed using a bead mill under the following conditions.

Bead material: glass

Bead diameter: 1.3 mm

Propeller rotation speed: 2,000 rpm

Dispersion time: 60 minutes

The dispersion obtained is applied to the surface of the elastic layer by blade coating and heat-dried at 150° C. for 30 minutes to form a surface layer with a film thickness of 10 μm, and a charging roller in Example 1 is thereby obtained.

Example 2

A charging roller is obtained in the same manner as in Example 1 except that, when the elastic layer is polished using the lapping papers, only the lapping paper with a grit size of 4000 is used to polish the elastic layer.

Example 3

A charging roller is obtained in the same manner as in Example 1 except that the polishing using the lapping papers is not performed and that the number of revolutions of the roller during the polishing using the grindstones is increased and the final poshing time is increased.

Example 4

A charging roller is obtained in the same manner as in Example 1 except that the polishing using the grindstones and the polishing using the lapping papers are not performed and that the temperature of the die used to form the roll using the extruder is increased.

Comparative Example 1

A charging roller is obtained in the same manner as in Example 1 except that the polishing using the lapping papers is not performed and that only the polishing using the grindstones is performed.

Comparative Example 2

A charging roller is obtained in the same manner as in Example 1 except that the finish polishing time during the polishing using the grindstones is reduced.

Comparative Example 3

A charging roller is obtained in the same manner as in Example 1 except that the polishing using the grindstones and the polishing using the lapping papers are not performed after the formation of the roll using the extruder.

<Evaluation>

One of the charging rollers in the Examples is attached to an image forming apparatus "ApeosPro C650" manufactured by FUJIFILM Business Innovation Corp.

This image forming apparatus is used to print a chart including a halftone image on 10 sheets, and the image on the tenth sheet is used to perform the following evaluation.

(Graininess)

Graininess is evaluated as follows.

The image is converted to the CIELCh space and subjected to two-dimensional FFT to compute an amplitude spectrum, and amplitudes at the same frequency in the amplitude spectrum are summed to obtain a one-dimensionalized spectrum. Next, the amplitude spectrum is multiplied by the visual characteristic (visual sensitivity correction coefficient (VTF)), and the resulting spectrum is integrated. The results are applied to a prediction model to compute a graininess evaluation value. A Spec is set to 100% (the smaller the Spec, the better), and the following evaluation criteria are used for the evaluation.

A: 96% or less

B: more than 96% and 98% or less

C: more than 98% and 100% or less

D: more than 100% and 101% or less

E: more than 101%

TABLE 1

| | Elastic layer PFVTF value | Surface layer PFVTF value | Evaluation Graininess |
|---|---|---|---|
| Example 1 | 0.6 | 0.61 | A |
| Example 2 | 0.7 | 0.72 | B |
| Example 3 | 1.3 | 1.25 | C |
| Example 4 | 1.3 | 1.3 | C |
| Comparative Example 1 | 1.8 | 1.79 | D |
| Comparative Example 2 | 3 | 3.11 | E |
| Comparative Example 3 | 2.4 | 2.32 | E |

As can be seen from the above results, the images obtained using the charging members (charging rollers) in the Examples are less grainy than the images obtained using the charging members (charging rollers) in the Comparative Examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

A charging member including:

an electrically conductive base;

an elastic layer disposed on the electrically conductive base; and a surface layer disposed on the elastic layer, wherein a PFVTF value of a surface of the surface layer is 1.5 or less, the PFVTF value being obtained by Fourier transforming a roughness curve of the surface of the surface layer that is measured in a circumferential direction to thereby obtain amplitude intensities at different periods, multiplying the amplitude intensities at different periods by VTF coefficients at respective periods that are obtained from a visual characteristic VTFL* (f=period) for lightness L* represented by Formula (V) below to thereby obtain corrected amplitude intensities at different periods, and integrating the corrected amplitude intensities in a period range of from 100 μm to 1000 μm inclusive:

$$VTFL^*(f)=5.05\times(e^{(-0.843\times1\times f)}-e^{(-1.454\times1\times f)}).\quad \text{Formula (V):}$$

(((2)))

The charging member according to (((1))), wherein the PFVTF value of the surface of the surface layer is 1.0 or less.

(((3)))

The charging member according to (((2))), wherein the PFVTF value of the surface of the surface layer is 0.7 or less.

(((4)))

The charging member according to any one of (((1))) to (((3))), wherein a PFVTF value of a surface of the elastic layer is 1.5 or less, the PFVTF value being obtained by Fourier transforming a roughness curve of the surface of the elastic layer that is measured in the circumferential direction to thereby obtain amplitude intensities at different periods, multiplying the amplitude intensities at different periods by the VTF coefficients at respective periods that are obtained from the visual characteristic VTFL* (f=period) for lightness L* represented by Formula (V) below to thereby obtain corrected amplitude intensities at different periods, and integrating the corrected amplitude intensities in a period range of from 100 μm to 1000 μm inclusive:

$$VTFL^*(f)=5.05\times(e^{(-0.843\times 1\times f)}-e^{(-1.454\times 1\times f)}). \quad \text{Formula (V):}$$

(((5)))

The charging member according to (((4))), wherein the PFVTF value of the surface of the elastic layer is 1.0 or less.

(((6)))

The charging member according to (((5))), wherein the PFVTF value of the surface of the elastic layer is 0.7 or less.

(((7)))

A charging device including the charging member according to any one of (((1))) to (((6))).

(((8)))

A process cartridge to be detachably attached to an image forming apparatus, the process cartridge including:

- an image holding member;
- a charging device that charges a surface of the image holding member and includes the charging member according to any one of (((1))) to (((6))), the charging member being disposed in contact with the surface of the image holding member; and
- an exposure device that irradiates the charged surface of the image holding member with light to form a latent image.

(((9)))

An image forming apparatus including:

- an image holding member;
- a charging device that charges a surface of the image holding member and includes the charging member according to any one of (((1))) to (((6))), the charging member being disposed in contact with the surface of the image holding member;
- an exposure device that irradiates the charged surface of the image holding member with light to form a latent image;
- a developing device that develops the latent image formed on the surface of the image holding member with a toner to form a toner image; and
- a transfer device that transfers the toner image formed on the surface of the image holding member onto a recording medium.

What is claimed is:

1. A charging member comprising:

- an electrically conductive base;
- an elastic layer disposed on the electrically conductive base; and
- a surface layer disposed on the elastic layer, wherein a PFVTF value of a surface of the surface layer is 1.5 or less, the PFVTF value being obtained by Fourier transforming a roughness curve of the surface of the surface layer that is measured in a circumferential direction to thereby obtain amplitude intensities at different periods, multiplying the amplitude intensities at different periods by VTF coefficients at respective periods that are obtained from a visual characteristic VTFL* (f=period) for lightness L* represented by Formula (V) below to thereby obtain corrected amplitude intensities at different periods, and integrating the corrected amplitude intensities in a period range of from 100 μm to 1000 μm inclusive:

$$VTFL^*(f)=5.05\times(e^{(-0.843\times 1\times f)}-e^{(-1.454\times 1\times f)}). \quad \text{Formula (V):}$$

2. The charging member according to claim 1, wherein the PFVTF value of the surface of the surface layer is 1.0 or less.

3. The charging member according to claim 2, wherein the PFVTF value of the surface of the surface layer is 0.7 or less.

4. A charging device comprising the charging member according to claim 3.

5. A process cartridge to be detachably attached to an image forming apparatus, the process cartridge comprising:

- an image holding member;
- a charging device that charges a surface of the image holding member and includes the charging member according to claim 3, the charging member being disposed in contact with the surface of the image holding member; and
- an exposure device that irradiates the charged surface of the image holding member with light to form a latent image.

6. A charging device comprising the charging member according to claim 2.

7. A process cartridge to be detachably attached to an image forming apparatus, the process cartridge comprising:

- an image holding member;
- a charging device that charges a surface of the image holding member and includes the charging member according to claim 2, the charging member being disposed in contact with the surface of the image holding member; and
- an exposure device that irradiates the charged surface of the image holding member with light to form a latent image.

8. An image forming apparatus comprising:

- an image holding member;
- a charging device that charges a surface of the image holding member and includes the charging member according to claim 2, the charging member being disposed in contact with the surface of the image holding member;
- an exposure device that irradiates the charged surface of the image holding member with light to form a latent image;
- a developing device that develops the latent image formed on the surface of the image holding member with a toner to form a toner image; and
- a transfer device that transfers the toner image formed on the surface of the image holding member onto a recording medium.

9. The charging member according to claim 1, wherein a PFVTF value of a surface of the elastic layer is 1.5 or less, the PFVTF value being obtained by Fourier transforming a roughness curve of the surface of the elastic layer that is measured in the circumferential direction to thereby obtain amplitude intensities at different periods, multiplying the amplitude intensities at different periods by the VTF coefficients at respective periods that are obtained from the visual characteristic VTFL* (f=period) for lightness L* represented by Formula (V) below to thereby obtain corrected amplitude intensities at different periods, and integrating the corrected amplitude intensities in a period range of from 100 μm to 1000 μm inclusive:

$$VTFL^*(f)=5.05\times(e^{(-0.843\times 1\times f)}-e^{(-1.454\times 1\times f)}). \quad \text{Formula (V):}$$

10. The charging member according to claim 9, wherein the PFVTF value of the surface of the elastic layer is 1.0 or less.

11. The charging member according to claim 10, wherein the PFVTF value of the surface of the elastic layer is 0.7 or less.

12. A charging device comprising the charging member according to claim 11.

13. A charging device comprising the charging member according to claim 10.

14. A process cartridge to be detachably attached to an image forming apparatus, the process cartridge comprising:

an image holding member;

a charging device that charges a surface of the image holding member and includes the charging member according to claim 10, the charging member being disposed in contact with the surface of the image holding member; and an exposure device that irradiates the charged surface of the image holding member with light to form a latent image.

15. A process cartridge to be detachably attached to an image forming apparatus, the process cartridge comprising:

an image holding member;

a charging device that charges a surface of the image holding member and includes the charging member according to claim 11, the charging member being disposed in contact with the surface of the image holding member; and an exposure device that irradiates the charged surface of the image holding member with light to form a latent image.

16. A charging device comprising the charging member according to claim 9.

17. A process cartridge to be detachably attached to an image forming apparatus, the process cartridge comprising:

an image holding member;

a charging device that charges a surface of the image holding member and includes the charging member according to claim 9, the charging member being disposed in contact with the surface of the image holding member; and an exposure device that irradiates the charged surface of the image holding member with light to form a latent image.

18. A charging device comprising the charging member according to claim 1.

19. A process cartridge to be detachably attached to an image forming apparatus, the process cartridge comprising:

an image holding member;

a charging device that charges a surface of the image holding member and includes the charging member according to claim 1, the charging member being disposed in contact with the surface of the image holding member; and an exposure device that irradiates the charged surface of the image holding member with light to form a latent image.

20. An image forming apparatus comprising:

an image holding member;

a charging device that charges a surface of the image holding member and includes the charging member according to claim 1, the charging member being disposed in contact with the surface of the image holding member;

an exposure device that irradiates the charged surface of the image holding member with light to form a latent image;

a developing device that develops the latent image formed on the surface of the image holding member with a toner to form a toner image; and a transfer device that transfers the toner image formed on the surface of the image holding member onto a recording medium.

* * * * *